(12) United States Patent
Lu et al.

(10) Patent No.: US 11,189,415 B2
(45) Date of Patent: Nov. 30, 2021

(54) MAGNETIC ELEMENT AND SWITCHING POWER SUPPLY USING THE SAME

(71) Applicant: Delta Electronics (Shanghai) CO., LTD, Shanghai (CN)

(72) Inventors: Zengyi Lu, Shanghai (CN); Haijun Yang, Shanghai (CN); Shaohua Zhu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 303 days.

(21) Appl. No.: 16/012,869

(22) Filed: Jun. 20, 2018

(65) Prior Publication Data
US 2019/0019610 A1    Jan. 17, 2019

(30) Foreign Application Priority Data
Jul. 13, 2017    (CN) .......................... 201720850788.4

(51) Int. Cl.
*H01F 27/24*  (2006.01)
*H01F 27/28*  (2006.01)
*H02M 7/217*  (2006.01)
*H02M 7/04*  (2006.01)
*H02M 3/155* (2006.01)
(Continued)

(52) U.S. Cl.
CPC .......... *H01F 27/24* (2013.01); *H01F 27/263* (2013.01); *H01F 27/2804* (2013.01); *H01F 27/36* (2013.01); *H01F 27/38* (2013.01); *H02M 3/155* (2013.01); *H02M 3/335* (2013.01);
(Continued)

(58) Field of Classification Search
CPC ...................................................... H01F 27/24
See application file for complete search history.

(56) References Cited

U.S. PATENT DOCUMENTS 4,257,087 A * 3/1981 Cuk .................. H02M 3/33538
363/16
6,388,896 B1 * 5/2002 Cuk .................. H02M 3/33592
363/16
(Continued)

FOREIGN PATENT DOCUMENTS

CN    201160024 Y  * 12/2008
CN    101529707 A    9/2009
(Continued)

*Primary Examiner* — Elvin G Enad
*Assistant Examiner* — Malcolm Barnes
(74) *Attorney, Agent, or Firm* — Qinghong Xu (57) ABSTRACT

A magnetic element includes a magnetic core and a winding. The magnetic core includes a first and second magnetic cover disposed oppositely, and at least one first magnetic column, at least one second magnetic column and at least one common magnetic column disposed between the first and second magnetic covers. The winding includes at least one first winding wound around at least one first magnetic column, and at least one second winding wound around at least one said second magnetic column. A first differential mode inductor is formed with the first winding, the first magnetic column, the first magnetic cover, the common magnetic column and the second magnetic cover. A power inductor or a power transformer is formed with the second winding, the second magnetic column, the first magnetic cover, the common magnetic column and the second magnetic cover.

18 Claims, 8 Drawing Sheets

(51) Int. Cl.
  *H01F 27/26* (2006.01)
  *H02M 3/335* (2006.01)
  *H01F 27/38* (2006.01)
  *H01F 27/36* (2006.01)
  *H01F 3/14* (2006.01)

(52) U.S. Cl.
  CPC ......... *H02M 7/043* (2013.01); *H02M 7/2176* (2013.01); *H01F 3/14* (2013.01)

(56) References Cited

U.S. PATENT DOCUMENTS

| | | | |
|---|---|---|---|
| 6,762,654 B1 | 7/2004 | Tanaka | |
| 6,980,077 B1* | 12/2005 | Chandrasekaran | H01F 27/255 336/212 |
| 7,839,255 B2* | 11/2010 | Nagano | H01F 3/10 336/221 |
| 8,325,004 B2* | 12/2012 | Nagano | H01F 30/06 336/221 |
| 2003/0197585 A1* | 10/2003 | Chandrasekaran | H01F 30/06 336/178 |
| 2005/0024179 A1* | 2/2005 | Chandrasekaran et al. | |
| 2005/0110606 A1* | 5/2005 | Vinciarelli | H01F 27/2804 336/200 |
| 2006/0097837 A1* | 5/2006 | Yamasaki | H01F 30/06 336/208 |
| 2008/0150665 A1* | 6/2008 | Li | H02M 7/003 336/177 |
| 2008/0150666 A1* | 6/2008 | Chandrasekaran | H02M 3/158 336/182 |
| 2009/0128277 A1* | 5/2009 | Moiseev | H01F 30/06 336/170 |
| 2009/0185398 A1* | 7/2009 | Cuk | H02M 3/33576 363/21.1 |
| 2010/0321958 A1* | 12/2010 | Brinlee | H01F 3/14 363/21.1 |
| 2010/0321960 A1* | 12/2010 | Nakahori | H01F 27/2847 363/21.04 |
| 2011/0116292 A1* | 5/2011 | Tsai | H02M 1/4225 363/126 |
| 2012/0293293 A1* | 11/2012 | Huang | H01F 3/14 336/212 |
| 2013/0121050 A1 | 5/2013 | Pietkiewicz | |
| 2014/0266530 A1* | 9/2014 | Andres | H01F 3/14 336/170 |
| 2015/0155089 A1* | 6/2015 | Lu et al. | H01F 27/24 |
| 2015/0282370 A1* | 10/2015 | Yang et al. | H05K 7/10 |
| 2016/0329874 A1* | 11/2016 | Mohammadpour et al. | H03H 7/01 |

FOREIGN PATENT DOCUMENTS

| | | |
|---|---|---|
| EP | 2104114 A1 | 9/2009 |
| JP | 2014530489 A | 11/2014 |
| WO | 2015106593 A1 | 7/2015 |

\* cited by examiner

MAGNETIC ELEMENT AND SWITCHING POWER SUPPLY USING THE SAME

CROSS REFERENCE

This application is based upon and claims priority to Chinese Patent Application No. 201720850788.4, filed on Jul. 13, 2017, the entire contents thereof are incorporated herein by reference.

TECHNICAL FIELD

The present disclosure relates to a magnetic element and a switching power supply using the same.

BACKGROUND

More and more switching power supply products, such as a brick power supply, are tending towards higher efficiency, higher power density, higher reliability and lower cost. Magnetic elements usually account for a large proportion of volume, weight, loss, and cost in the switching power supply product. Therefore, how to reduce the volume and the weight and the like of the magnetic elements is a bottleneck problem to he urgently solved for further development of the switching power supply products. How to reduce the volume and the weight of the magnetic elements will also have a critical influence on the success of development of the power supply products, especially for the brick power supply with printed circuit boards (PCB) as windings.

In addition, the continuous pursuit of lower cost of power supplies also strongly requires more concise and easier assembly of components, especially passive components, in the power supply products, in order to save assembly time and cost. Magnetic element is a very important kind of passive components. Magnetic integration technology is one of the effective solutions to the above problems. However, in the prior art some power devices are integrated with other power devices, or EMI differential mode inductors are integrated with common mode inductors. It has not yet been found/reported that the EMI differential mode inductors are integrated with the power inductors or power transformers.

The above information disclosed in this BACKGROUND section is only for enhanced understanding of the background of the disclosure and therefore it may contain information that does not constitute the relevant technology known to those skilled in the art.

SUMMARY

The additional aspects and advantages of the disclosure will partly be set forth in the following description, and partly become apparent from the description or may be learnt from practice of the disclosure.

According to one aspect of the present disclosure, a magnetic element comprises a magnetic core and a winding. The magnetic core comprises a first magnetic cover and a second magnetic cover which is set oppositely to the first magnetic cover, and at least one first magnetic column, at least one second magnetic column and at least one common magnetic column, which columns are disposed between the first magnetic cover and the second magnetic cover. The winding comprises at least one first winding wound around at least one said first magnetic column, respectively, wherein at least one first differential mode inductor is formed with at least one said first winding, at least one said first magnetic column, the first magnetic cover, at least one said common magnetic column and the second magnetic cover, and at least one second winding wound around at least one said second magnetic column, respectively, wherein at least one power inductor or power transformer is formed with at least one said second winding, at least one said second magnetic column, the first magnetic cover, at least one said common magnetic column and the second magnetic cover.

BRIEF DESCRIPTION OF THE DRAWINGS

The above and other features and advantages of the disclosure will become more apparent by describing exemplary embodiments of the disclosure with reference to the accompanying drawings.

List of numeral references in the figures: 1-magnetic core, 11-first magnetic cover, 12-second magnetic cover, 13-first magnetic column, 14-second magnetic column, 15-third magnetic column, 16-common magnetic column, 2-winding, 21-first winding, 22-second winding, 23-third winding.

DETAILED DESCRIPTION

Now the exemplary embodiments will be described more fully with reference to the accompanying drawings. However, the exemplary embodiments can be implemented in various ways and should not be construed as limited to the embodiments set forth herein; rather, these embodiments are provided to make the disclosure full and complete and to fully convey the concept of the exemplary embodiments to those skilled in the art. The same reference numerals through the drawings denote the same or similar structures, and thus their detailed description will be omitted.

The magnetic element and the switching power supply are provided by the disclosure. The switching power supply includes the magnetic element. The magnetic element is an integration of a power inductor or a power transformer and a differential mode inductor. The volume, the weight, the loss and the like of the magnetic element can be significantly reduced, and the power density of the switching power supply is improved. It makes the assembly of the magnetic element more concise and easier, and saves man-hours and costs.

Figure 1:
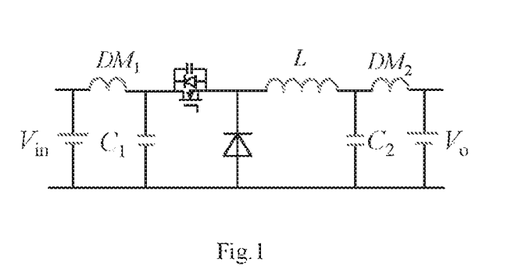
FIG. 1 shows a circuit architecture diagram of a switching power supply according to an exemplary embodiment of the disclosure.
Figure 2:
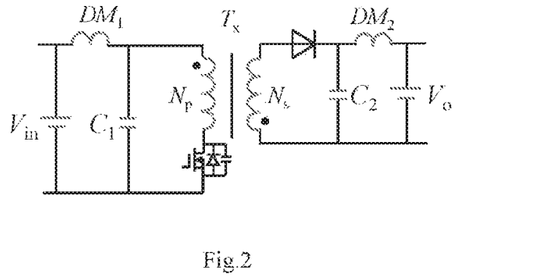
FIG. 2 shows a circuit architecture diagram of a switching power supply according to another exemplary embodiment of the disclosure.

Referring to FIGS. 1 and 2 which show a circuit architecture diagram according to an exemplary embodiment of the disclosure, respectively, the switching power source includes a magnetic element.

As shown in FIG. 1, the switching power supply adopts a Buck circuit which includes an input differential mode inductor DM1, an input differential mode capacitor C1, a switching device, a diode, a power inductor L, and an output differential mode capacitor C2 and an output differential mode inductor DM2 and the like. The Buck circuit has an input terminal for receiving an input voltage Vin and an output terminal for outputting a voltage Vo. Here, the input differential mode inductor DM1 and the output differential mode inductor DM2 are provided for EMI filtering.

As shown in FIG. 2, the switching power supply adopts a Flyback (flyback converter) circuit which includes an input differential mode inductor DM1, an input differential mode capacitor C1, a power transformer Tx, a switching device, a diode, and an output differential mode capacitor C2 and an output differential mode inductor DM2 and the like. The Flyback circuit has an input terminal for receiving an input voltage Vin and an output terminal for outputting a voltage Vo.

In other embodiments, in addition to the Buck or Flyback circuit mentioned above, the switching power supply may alternatively adopt a Boost (boosting) circuit, a Buck-Boost (boost and buck) circuit, or various bridge circuits. That is to say, any switching power supply which includes a differential mode inductor and a power inductor or a power transformer will use the magnetic element which is the integration of the differential mode inductor and the power inductor or the power transformer.

First Embodiment of Magnetic Element

Figure 3:
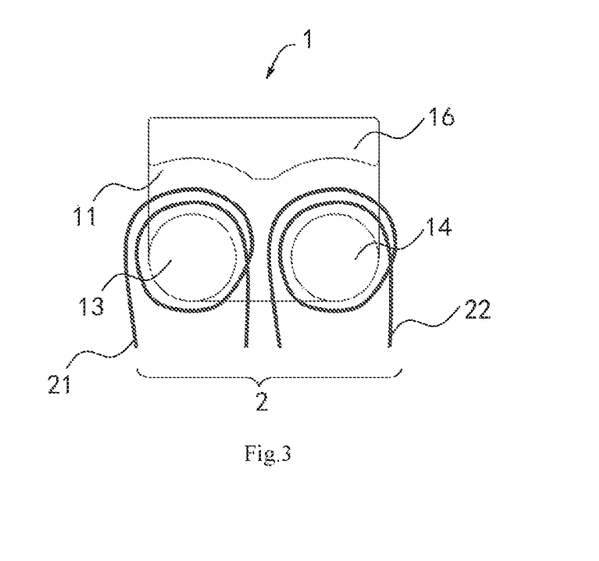
FIG. 3 is a schematic structural view of an embodiment of a magnetic element of the disclosure.

Referring to FIG. 3 which is a schematic structural view of an embodiment of a magnetic element of the disclosure, the magnetic element may be the integration of the input differential mode inductor DM1 and the power inductor I, or the integration of the power inductor I, and the output differential mode inductor DM2 in FIG. 1, alternatively may be the integration of the input differential mode inductor DM1 and the power transformer Tx or the integration of the output differential mode inductor DM2 and the power transformer Tx in FIG. 2. The magnetic element according to the first embodiment of the disclosure includes a magnetic core 1 and a winding 2.

Figure 4:
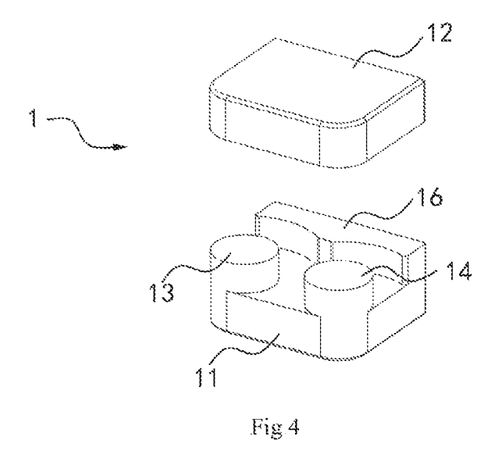
FIG. 4 is an exploded perspective view of a magnetic core of the magnetic element shown in FIG. 3.
Figure 5:
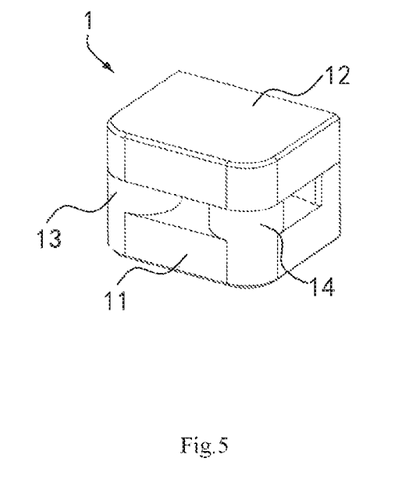
FIG. 5 is an assembled perspective view of a magnetic core of the magnetic element shown in FIG. 3.

Referring to FIGS. 3, 4 and 5. FIG. 4 is an exploded perspective view of a magnetic core of the magnetic element shown in FIG. 3, and FIG. 5 is an assembled perspective view of a magnetic core of the magnetic element shown in FIG. 3.

As shown in FIGS. 4 and 5, the magnetic core 1 includes a first magnetic cover 11, a second magnetic cover 12, at least one first magnetic column 13, at least one second magnetic column 14, and at least one common magnetic column 16. The magnetic core 1 according to the present disclosure may be made of a ferrite material, that is, the first magnetic cover 11, the at least one first magnetic column 13, the at least one second magnetic column 14, the at least one common magnetic column 16 and the second magnetic cover 12 may be made of a ferrite material. There is no extra designed gap between the common magnetic column 16 and the first magnetic cover 11, and there is no extra designed gap between the common magnetic column 16 and the second magnetic cover 12. However, the present disclosure is not limited thereto, and other materials suitable for making the magnetic core are also applicable.

FIG. 3 shows only one first magnetic column 13, one second magnetic column 14, and one common magnetic column 16. Hereinafter, only the one first magnetic column 13, the one second magnetic column 14 and the one common magnetic column 16 will be taken as an example for illustration. However, those skilled in the art should understand that the number of the first magnetic column 13, the second magnetic column 14, and the common magnetic column 16 are not limited to only one, but can be appropriately adjusted according to specific conditions.

The first and second magnetic covers 11 and 12 are oppositely disposed, and the first magnetic column 13, the second magnetic column 14, and the common magnetic column 16 are disposed between the first magnetic cover 11 and the second magnetic cover 12. Specifically, each of the first magnetic column 13, the second magnetic column 14, and the common magnetic column 16 may have one end connected with the first magnetic cover 11 by means of adhesion, integral formation (formed in one piece) or suspension (i.e., in such a way that the magnetic columns and the magnetic cover are disposed opposite to each other with a gap therebetween, which gap may be filled with a non-magnetically conductive and non-electrically conductive material, such as FR4, bakelite, Nomex paper, etc.) and the like, and another end connected with the second magnetic cover 12 also by means of adhesion, integral formation (formed in one piece) or suspension and the like. Moreover, the first magnetic column 13 and the second magnetic column 14 may be provided therein with one or more air gaps. The term "connect" used in the disclosure includes a mutual contact configuration and a suspension configuration.

As shown in FIG. 3, the common magnetic column may be in the shape like "3", that is, the common magnetic column 16 is provided with an arc-shaped surface on either side facing the first magnetic column 13 and the second magnetic column 14.

As shown in FIG. 3, the winding of the magnetic element according to the disclosure includes at least one first winding 21 and at least one second winding 22. Only one first winding 21 and one second winding 22 are shown in FIG. 3. However, those skilled in the art should understand that the numbers of the first windings 21 and the second windings 22 are not limited to only one, but can be appropriately adjusted according to specific conditions, and that each winding can be adjusted in the number of turns or turn ratio according to the needs to conveniently achieve external electrical properties as required.

The first winding 21 and the second winding 22 may he PCB windings, alternatively may be other types of windings such as enameled wires, triple insulated wires and prefabricated copper strip/sheet wires.

The first winding 21 is wound around the first magnetic column 13. A first differential mode inductor which has an applicable frequency range of 150 k-30 MHz is formed with the first winding 21, the first magnetic column 13, the first magnetic cover 11, the common magnetic column 16 and the second magnetic cover 12, but is not limited thereto.

The second winding 22 is wound around the second magnetic column 14. A power inductor or a power transformer is formed with the second winding 22, the second magnetic column 14, the first magnetic cover 11, the common magnetic column 16 and the second magnetic cover 12.

The common magnetic column 16 is shared by the first differential mode inductor and the power inductor or the power transformer, which improves the integration level of the magnetic element.

In the embodiment, one magnetic element is an integration of a power inductor or a power transformer and a differential mode inductor such that the structure of the magnetic element is compact, and the volume and weight of the magnetic element is reduced, and the power density of the switching power supply using the magnetic element is improved, and man-hours and costs are saved.

Since there is no limitation to the numbers of the first winding 21 and second winding 22, in the disclosure there is no limitation to the numbers of the differential mode inductor and the power inductor or the power transformer that may be formed.

Second Embodiment of Magnetic Element

Figure 6:
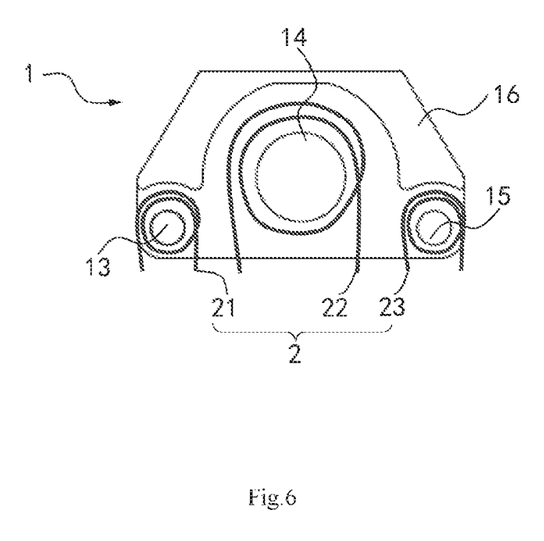
FIG. 6 is a schematic structural view of another embodiment of a magnetic element of the disclosure.

Referring to FIG. 6 which is a schematic structural view of another embodiment of a magnetic element according to the disclosure. As shown in FIG. 6, the magnetic element according to the second embodiment of the disclosure includes a core 1 and a winding 2.

Figure 7:
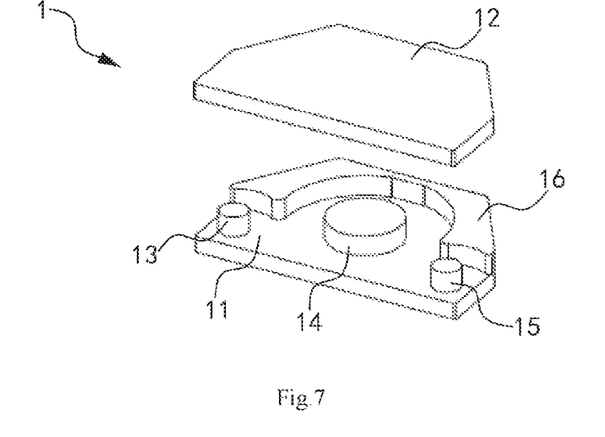
FIG. 7 is an exploded perspective view of a magnetic core of the magnetic element shown in FIG. 6.
Figure 8:
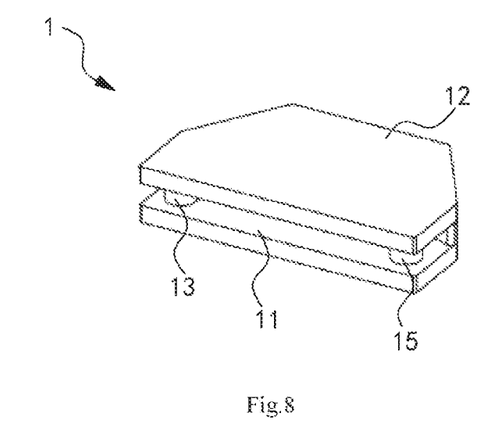
FIG. 8 is an assembled perspective view of a magnetic core of the magnetic element shown in FIG. 6.

Referring to FIGS. 6, 7 and 8. FIG. 7 is an exploded perspective view of a magnetic core of the magnetic element shown in FIG. 6, and FIG. 8 is an assembled perspective view of a magnetic core of the magnetic element shown in FIG. 6.

As shown in FIGS. 7 and 8, the magnetic core 1 includes a first magnetic cover 11, a second magnetic cover 12, at least one first magnetic column 13, at least one second magnetic column 14, at least one third magnetic column 15 and at least one common magnetic column 16. The magnetic core 1 according to the disclosure may be made of a ferrite material, that is, the first magnetic cover 11, the first magnetic column 13, the second magnetic column 14, the common magnetic column 16, the second magnetic cover 12 and the 8 third magnetic cover 11 may be made of a ferrite material. There is no extra designed gap between the common magnetic column 16 and the first magnetic cover 11, and there is no extra designed gap between the common magnetic column 16 and the second magnetic cover 12. However, the present disclosure is not limited thereto, and other materials suitable for making the magnetic core are also applicable.

FIG. 6 shows only one first magnetic column 13, one second magnetic column 14, one third magnetic column 15 and one common magnetic column 16. Hereinafter, only the one first magnetic column 13, the one second magnetic column 14, the one third magnetic column 15 and the one common magnetic column 16 will be taken as an example for illustration. However, those skilled in the art should understand that the numbers of the first magnetic column 13, the second magnetic column 14, the third magnetic column 15 and the common magnetic column 16 are not limited to only one, but can be appropriately adjusted according to specific conditions.

The first magnetic column 13, the second magnetic column 14, the third magnetic column 15 and the common magnetic column 16 each may have one end connected with the first magnetic cover 11 by means of adhesion, integral formation (formed in one piece suspension(i.e., in such a way that the magnetic columns and the magnetic cover are disposed opposite to each other with a gap therebetween, which gap may be filled with a non-magnetically conductive and non-electrically conductive material, such as FR4, bakelite, Nomex paper, etc. and the like, and another end connected with the second magnetic cover 12 by means of adhesion, integral formation (formed in one piece) or suspension and the like. Specifically, the first magnetic column 13, the second magnetic column 14, the third magnetic column 15 and the common magnetic column 16 may be integrally formed with the first magnetic cover 11. Alternatively, the first magnetic column 13, the second magnetic column 14, the third magnetic column 15 and the common magnetic column 16 may be integrally formed with the second magnetic cover 12. Alternatively, the common magnetic column 16 may be integrally formed with the first magnetic cover 11 while the first magnetic column 13, the second magnetic column 14 and the third magnetic column 15 may be integrally formed with the second magnetic cover 12. Alternatively, the common magnetic column 16 may be integrally formed with the first magnetic cover 11 while the first magnetic column 13, the second magnetic column 14 or the third magnetic column 15 may be integrally formed with the second magnetic cover 12. The first magnetic column 13, the second magnetic column 14, the third magnetic column 15 and the common magnetic column 16 may be adhered to the first magnetic cover 11. Alternatively, the first magnetic column 13, the second magnetic column 14, the third magnetic column 15 and the common magnetic column 16 may be adhered to the second magnetic cover 12. Alternatively, the common magnetic column 16 may be adhered to the first magnetic cover 11 while the first magnetic column 13, the second magnetic column 14 and the third magnetic column 15 may be adhered to the second magnetic cover 12. Alternatively, the common magnetic column 16 may be adhered to the first magnetic cover 11 while the first magnetic column 13, the second magnetic column 14 or the third magnetic column 15 may be adhered to the second magnetic cover 12. The connection of the first magnetic column 13, the second magnetic column 14, the third magnetic column 15 and the common magnetic column 16 with the first or second magnetic cover 11 or 12 is not limited thereto. Moreover, the first magnetic column 13, the second magnetic column 14 or the third magnetic column 15 may be provided therein with one or more air gaps. The term "connect" used in the disclosure includes a mutual contact configuration and a suspension configuration.

As shown in FIGS. 6 and 7, the second magnetic column 14 is positioned between the first magnetic column 13 and the third magnetic column 15. The common magnetic column 16 may be the shape of "C". In other embodiments, the common magnetic column 16 may also be other shapes such as a long strip or multiple arc segments.

As shown in FIG. 6, the winding 2 of the magnetic element according to the disclosure includes at least one first winding 21, at least one second winding 22 and at least one third winding 23. Only one first winding 21, one second winding 22 and one third winding 23 are shown in FIG. 7. However, those skilled in the art should understand that the numbers of the first windings 21, the second windings 22 and the third winding 23 are not limited to only one, but can be appropriately adjusted according to specific conditions, and that each winding can be adjusted in the number of turns or transformation ratio according to the needs to conveniently achieve external electrical properties as required.

The first winding 21, the second winding 22 and the third winding 23 may be PCB windings, alternatively may be other types of windings such as enameled wires, triple insulated wires and prefabricated copper strip/sheet wires.

The first winding 21 is wound around the first magnetic column 13. A first differential mode inductor which has an applicable frequency range of 150 k-30 MHz is formed with the first winding 21, the first magnetic column 13, the first magnetic cover 11, the common magnetic column 16 and the second magnetic cover 12, but is not limited thereto.

The second winding 22 is wound around the second magnetic column 14. A power inductor or a power transformer is formed with the second winding 22, together with the second magnetic column 14, the first magnetic cover 11, the common magnetic column 16 and the second magnetic cover 12.

The third winding 23 is wound around the third magnetic column 15. A second differential mode inductor which has an applicable frequency range of 150 k-30 MHz is formed with the third winding 23, together with the third magnetic column 15, the first magnetic cover 11, the common magnetic column 16 and the second magnetic cover 12, but is not limited thereto.

The magnetic element shown in FIG. 6 has a higher integration effect in comparison with the magnetic element shown in FIG. 3, that is, the magnetic element shown in FIG. 6 is added with at least third magnetic column with respect to the magnetic element shown in FIG. 3 to integrate with the second differential mode inductor, thereby achieving a higher level of integration of the first differential mode inductor, the power inductor and the second differential mode inductor, or a higher level of integration of the first differential mode inductor, the power transformer and the second differential mode inductor.

The common magnetic column 16 is shared by the first differential mode inductor, the power inductor or the power transformer, and the second differential mode inductor, which not only improves the integration level of the magnetic element, but also makes the structure more stable and durable, and makes assembly of the magnetic core easier.

In the embodiment shown in FIG. 6, the first differential mode inductor is an input differential mode inductor DM1, the second differential mode inductor is an output differential mode inductor DM2, and the power inductor L or the power transformer Tx is positioned between the input differential mode inductor DM1 and the output differential mode inductor DM2.

Since there is no limitation to the numbers of the first, second and third magnetic columns 13, 14 and 15, and neither to the numbers of the first, second and third windings 21, 22 and 23, in the disclosure there is no limitation to the numbers of the input differential mode inductor DM1, the power inductor L or the power transformer Tx, and the output differential mode inductor DM2 that may be formed.

The magnetic element in an embodiment of the disclosure is integrated with at least three different functions, allowing the assembly of the magnetic core on the PCB to be very simple and convenient. And the size for assembly does not have to be reserved between the magnetic elements of various functions on the PCB, making the PCB layout more compact.

The magnetic element as provided by the disclosure is an integration of a power inductor or a power transformer and a differential mode inductor. The differential mode inductor and the power inductor or the power transformer can share part of the magnetic path, and a structure of the magnetic element is compact. As such, the volume, weight, footprint size and the like of the magnetic element can be reduced, and the power density of the switching power supply can be effectively increased. At the same time, since the power magnetic parts and the EMI magnetic parts are integrated together, the assembly of the magnetic core is also simpler, and man-hours and costs are saved.

Switching Power Supply

Referring to FIGS. 1 and 2 which show a circuit architecture diagram of a switching power supply according to an exemplary embodiment of the disclosure, respectively. The switching power supply according to the disclosure includes the aforesaid magnetic element according to the disclosure.

The switching power supply further includes at least one first differential mode capacitor. At least one said first differential mode capacitor is disposed between at least one said first differential mode inductor DM1 and the power inductor L or the power transformer Tx of the magnetic element, with a switching device being optionally included between at least one said first differential mode inductor DM1 and the power inductor L or the power transformer Tx. At least one second differential mode capacitor C2 is disposed between at least one second differential mode inductor DM2 and the power inductor L or the power transformer Tx, with a switching device being optionally included between at least one second differential mode inductor DM2 and the power inductor L or the power transformer Tx.

Relative terms may be used in the above embodiments, such as "above" or "below", to describe the relative relationship of one element with respect to another element shown in the figures. It can be understood that if the shown device is turned upside down, the element described as being "above" will become a "below" element. The terms "a", "the", and "at least one" are used to indicate the presence of one or more elements/components/and the like. The terms "include", "include" and "have" are intended to be inclusive and mean that there may be additional components or the like in addition to the listed components. "First" and "second" are only used as references and do not have limitation to the number of their subjects.

It should be understood that the disclosure does not limit its application to the detailed structure and arrangement of the components set forth herein. The disclosure can have other embodiments and be practiced and implemented in various ways. The foregoing variations and modifications fall within the scope of the disclosure. It should be understood that the disclosure disclosed and defined herein extends to all alternative combinations of two or more individual features mentioned in or evident from the text and/or drawings. All of these different combinations constitute multiple alternative aspects of the disclosure. The embodiments described herein illustrate the best mode known for practicing the disclosure and will enable those skilled in the art to utilize the disclosure.

What is claimed is:

1. A magnetic element comprising:
   a magnetic core comprising:
      a first magnetic cover and a second magnetic cover disposed oppositely, and
      at least one first magnetic column, at least one second magnetic column and at least one common magnetic column disposed between the first magnetic cover and the second magnetic cover; and
   a winding comprising:
      at least one first winding wound around at least one said first magnetic column, respectively, wherein at least one first differential mode inductor is formed with at least one said first winding, at least one said first magnetic column, the first magnetic cover, at least one said common magnetic column and the second magnetic cover, wherein the first differential mode inductor is configured to connect with a first differential mode capacitor, and the first differential mode capacitor is coupled in parallel to an input terminal of a switching power supply; and
      at least one second winding wound around at least one said second magnetic column, respectively, wherein at least one power inductor or power transformer is formed with at least one said second winding, at least one said second magnetic column, the first magnetic cover, at least one said common magnetic column and the second magnetic cover,
wherein all of the first magnetic column, the second magnetic column and the common magnetic column are made from the same material
wherein there is no extra designed gap between the common magnetic column and the first magnetic cover, and there is no extra designed gap between the common magnetic column and the second magnetic cover.

2. The magnetic element according to claim 1, wherein the magnetic core further comprises at least one third magnetic column disposed between the first magnetic cover and the second magnetic cover;
the winding further comprises at least one third winding wound around at least one said third magnetic column, respectively, wherein a second differential mode inductor is formed with at least one said third winding, at least one said third magnetic column, the first magnetic cover, at least one said common magnetic column and the second magnetic cover.

3. The magnetic element according to claim 2, wherein the first differential mode inductor is an input differential mode inductor, and the second differential mode inductor is an output differential mode inductor.

4. The magnetic element according to claim 2, wherein at least one said second magnetic column is positioned between at least one said first magnetic column and at least one said third magnetic column.

5. The magnetic element according to claim 2, wherein at least one said common magnetic column is in the shape of "C".

6. The magnetic element according to claim 1, wherein the first magnetic cover, at least one said first magnetic column, at least one said second magnetic column, at least one common magnetic column and the second magnetic cover are made of a ferrite material.

7. The magnetic element according to claim 2, wherein the first magnetic cover, at least one said first magnetic column, at least one said second magnetic column, at least one common magnetic column, the second magnetic cover and at least one said third magnetic column are made of a ferrite material.

8. The magnetic element according to claim 1, wherein at least one said first winding and at least one said second winding are both a PCB winding.

9. The magnetic element according to claim 2, wherein at least one said first winding, at least one said second winding and at least one said third winding are a PCB winding.

10. The magnetic element according to claim 1, wherein the first differential mode inductor has an applicable frequency range of 150 k-30 MHz.

11. The magnetic element according to claim 2, wherein the second differential mode inductor has an applicable frequency range of 150 k-30 MHz.

12. The magnetic element according to claim 2, wherein at least one said common magnetic column is integrally formed with the first magnetic cover, while at least one said first magnetic column, at least one said second magnetic column or at least one said third magnetic column is integrally formed with the second magnetic cover.

13. The magnetic element according to claim 2, wherein at least one said common magnetic column, at least one said first magnetic column, at least one said second magnetic column, and at least one third magnetic column are integrally formed with the first magnetic cover or the second magnetic cover.

14. The magnetic element according to claim 2, wherein at least one said common magnetic column is adhered to the first magnetic cover, while at least one said first magnetic column, at least one said second magnetic column or at least one said third magnetic column is adhered to the second magnetic cover.

15. The magnetic element according to claim 2, wherein at least one said common magnetic column, at least one said first magnetic column, at least one said second magnetic column, and at least one third magnetic column are adhered to the first magnetic cover or the second magnetic cover.

16. A switching power supply comprising the magnetic element according to claim 1.

17. The switching power supply according to claim 16, wherein the switching power supply further comprises at least one first differential mode capacitor disposed between at least one said first differential mode inductor and at least one said power inductor of the magnetic element, or between at least one said first differential mode inductor and the power transformer of the magnetic element.

18. The switching power supply according to claim 16, wherein the magnetic core of the magnetic element further comprises at least one third magnetic column disposed between the first magnetic cover and the second magnetic cover;
the winding further comprises at least one third winding wound around said at least one third magnetic column, and forms a second differential mode inductor with said at least one third magnetic column, said at least one third magnetic column, the first magnetic cover, at least one said common magnetic column and the second magnetic cover;
the switching power supply further comprises at least one second differential mode capacitor disposed between at least one said second differential mode inductor and at least one said power inductor, or between at least one said second differential mode inductor and at least one said power transformer.

* * * * *